(12) United States Patent
Fink et al.

(10) Patent No.: US 8,749,928 B2
(45) Date of Patent: Jun. 10, 2014

(54) AIRCRAFT ELECTRICAL APPLIANCE

(75) Inventors: Joel G. Fink, Stow, OH (US); Jon D. Shearer, Hartville, OH (US); Richard J. Carpino, II, Canton, OH (US); Tommy M. Wilson, Cuyahoga Falls, OH (US)

(73) Assignee: Goodrich Corporation, Charlotte, NC (US)

( * ) Notice: Subject to any disclaimer, the term of this patent is extended or adjusted under 35 U.S.C. 154(b) by 763 days.

(21) Appl. No.: 12/977,607

(22) Filed: Dec. 23, 2010

(65) Prior Publication Data

US 2011/0149447 A1   Jun. 23, 2011

Related U.S. Application Data

(60) Provisional application No. 61/289,616, filed on Dec. 23, 2009.

(51) Int. Cl.
 *H02H 9/08* (2006.01)
 *H02H 3/33* (2006.01)

(52) U.S. Cl.
 USPC .......................................................... 361/42

(58) Field of Classification Search
 USPC .......................................................... 361/42
 See application file for complete search history.

(56) References Cited

U.S. PATENT DOCUMENTS

| | | | |
|---|---|---|---|
| 3,558,980 A | 1/1971 | Florance et al. | |
| 3,668,470 A | 6/1972 | Ambler et al. | |
| 4,055,777 A | 10/1977 | Black | |
| 4,077,056 A | 2/1978 | Galiana | |
| 4,216,515 A | 8/1980 | Van Zeeland | |
| 4,353,103 A | 10/1982 | Whitlow | |
| 4,484,243 A * | 11/1984 | Herbst et al. | 361/50 |
| 4,567,544 A * | 1/1986 | Ronemus et al. | 361/753 |
| 4,949,214 A * | 8/1990 | Spencer | 361/95 |
| 5,361,183 A | 11/1994 | Wiese | |
| 5,363,269 A | 11/1994 | McDonald | |
| 5,475,557 A * | 12/1995 | Larom et al. | 361/46 |
| 5,475,609 A * | 12/1995 | Apothaker | 700/292 |
| 5,815,352 A * | 9/1998 | Mackenzie | 361/42 |
| 5,835,322 A | 11/1998 | Smith | |
| 6,583,975 B2 | 6/2003 | Bax | |
| 6,611,659 B2 | 8/2003 | Meisiek | |
| 6,618,229 B2 | 9/2003 | Bax | |
| 6,691,923 B2 | 2/2004 | Shearer | |
| 6,731,482 B2 | 5/2004 | Juncu | |
| 6,788,505 B2 | 9/2004 | Bax | |
| 6,834,159 B1 | 12/2004 | Schramm | |
| 7,016,171 B2 | 3/2006 | Bax et al. | |
| 7,064,941 B2 | 6/2006 | Bax | |
| 7,248,451 B2 | 7/2007 | Bax et al. | |

(Continued)

FOREIGN PATENT DOCUMENTS

WO   WO0117850 A1   3/2001

*Primary Examiner* — Ronald W Leja
(74) *Attorney, Agent, or Firm* — Cantor Colburn LLP

(57) ABSTRACT

An aircraft electrical appliance is provided with a ground-fault-interruption device (50) for protecting it in the event of problematic current loss due to, for example, a compromise in electrical insulation. The device (50) has a GFI circuit (60) comprising a current differential determiner (70), a trigger (80) that is activated upon the current differential corresponding to ground-fault situation, and an interrupter (90) that interrupts power supply to the appliance upon the trigger (80) being activated. The GFI circuit (60) is electrically independent of electrical controller components of the appliance, thereby avoiding expensive software configuration and confirmation.

17 Claims, 20 Drawing Sheets

(56) References Cited

U.S. PATENT DOCUMENTS

| | | |
|---|---|---|
| 7,312,965 B2 | 12/2007 | Bax |
| 7,315,437 B2 * | 1/2008 | Bonilla et al. ............ 361/42 |
| 7,336,457 B2 | 2/2008 | Liscinsky, III |
| 7,362,551 B2 | 4/2008 | Bax et al. |
| 7,375,937 B2 | 5/2008 | Bax et al. |
| 7,417,835 B2 | 8/2008 | Bax et al. |
| 7,417,836 B2 | 8/2008 | Bax et al. |
| 7,557,330 B2 | 7/2009 | Shearer |
| 7,630,182 B2 | 12/2009 | Bax |
| 7,667,935 B2 | 2/2010 | Bax et al. |
| 7,672,099 B2 | 3/2010 | Bax et al. |
| 7,688,558 B2 | 3/2010 | Bax et al. |
| 2006/0042846 A1 * | 3/2006 | Kojori et al. ............ 180/65.8 |
| 2007/0262074 A1 * | 11/2007 | Shearer ............ 219/532 |
| 2007/0279814 A1 * | 12/2007 | Bonilla et al. ............ 361/42 |
| 2011/0149447 A1 * | 6/2011 | Fink et al. ............ 361/45 |

\* cited by examiner

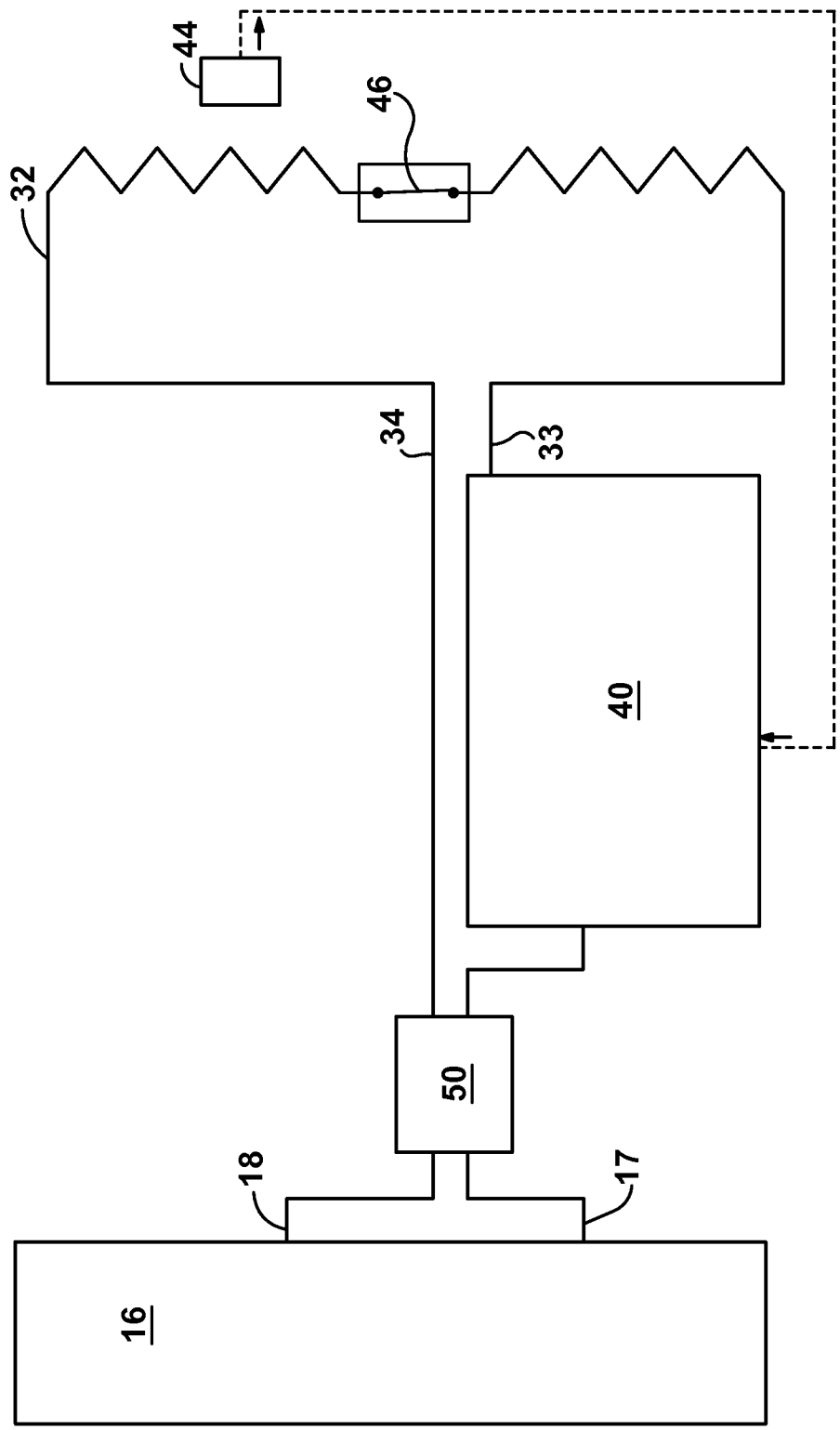

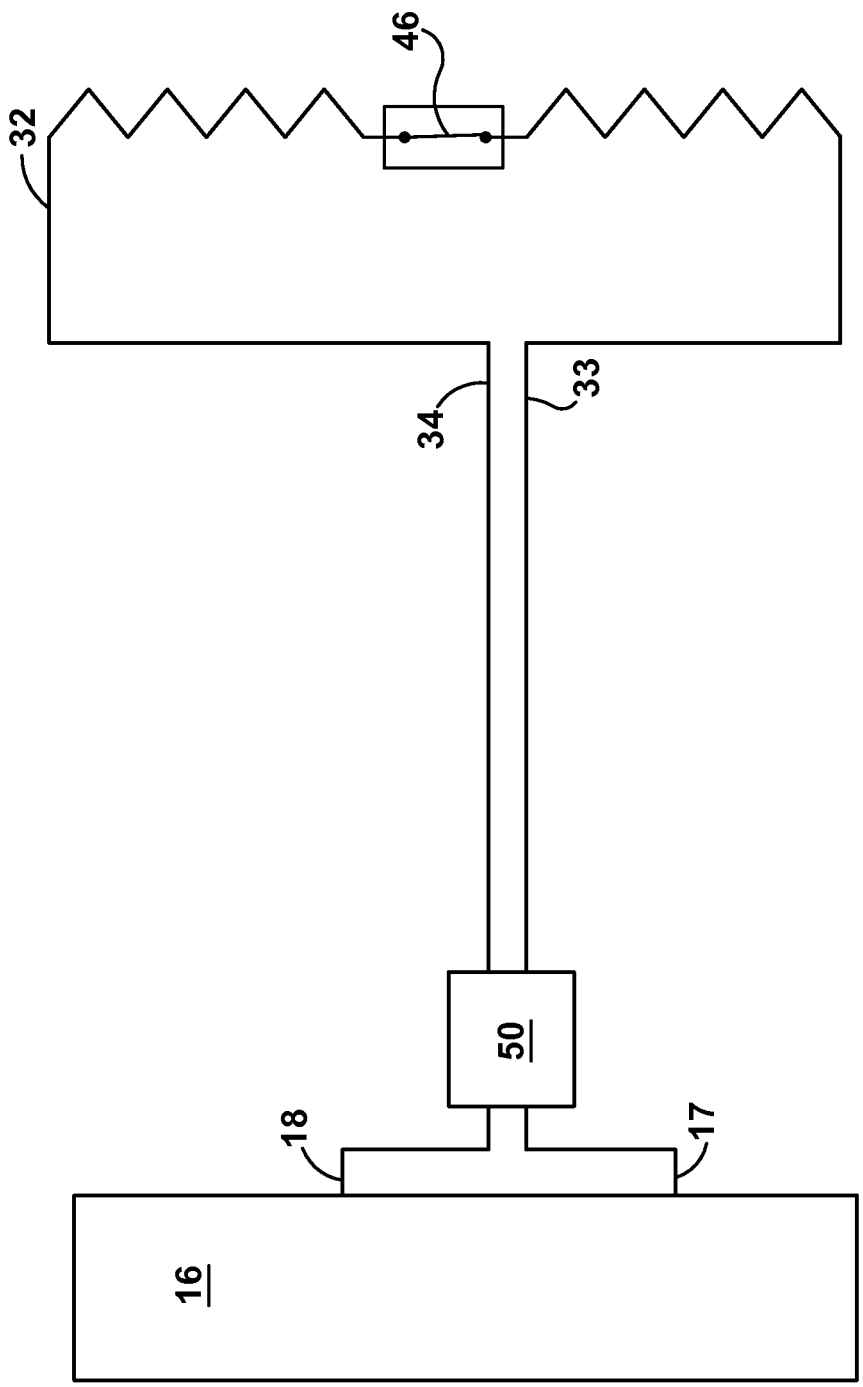

AIRCRAFT ELECTRICAL APPLIANCE

RELATED APPLICATION

This application claims priority under 35 U.S.C. §119(e) to U.S. Provisional Patent Application No. 61/289,616 filed on Dec. 23, 2009. The entire disclosure of this provisional application is hereby incorporated by reference. To the extent that inconsistencies exist between the present application and any incorporated applications, the present application should be used to govern interpretation for the purposes of avoiding indefiniteness and/or clarity issues.

BACKGROUND

An aircraft will commonly include electrical appliances adapted to insure the comfort and convenience of crew and passengers. Such aircraft electrical appliances can include, for example, heated floor panels to maintain the cabin at a suitable temperature. In any event, an aircraft appliance receives electrical power from an onboard source wherein frequency can vary quite significantly (e.g., 360 Hz to 800 Hz).

SUMMARY

An aircraft electrical appliance is provided with a ground-fault-interrupt device that disables power supply should a ground fault occur. The device can have a cost-effective construction, can be made without sophisticated software, and/or can accommodate the range of power frequencies commonly encountered in an aircraft situation.

DRAWINGS

FIGS. 3A-3C show possible electrical arrangements of the appliance and its ground-fault-interruption device.

Figure 5:
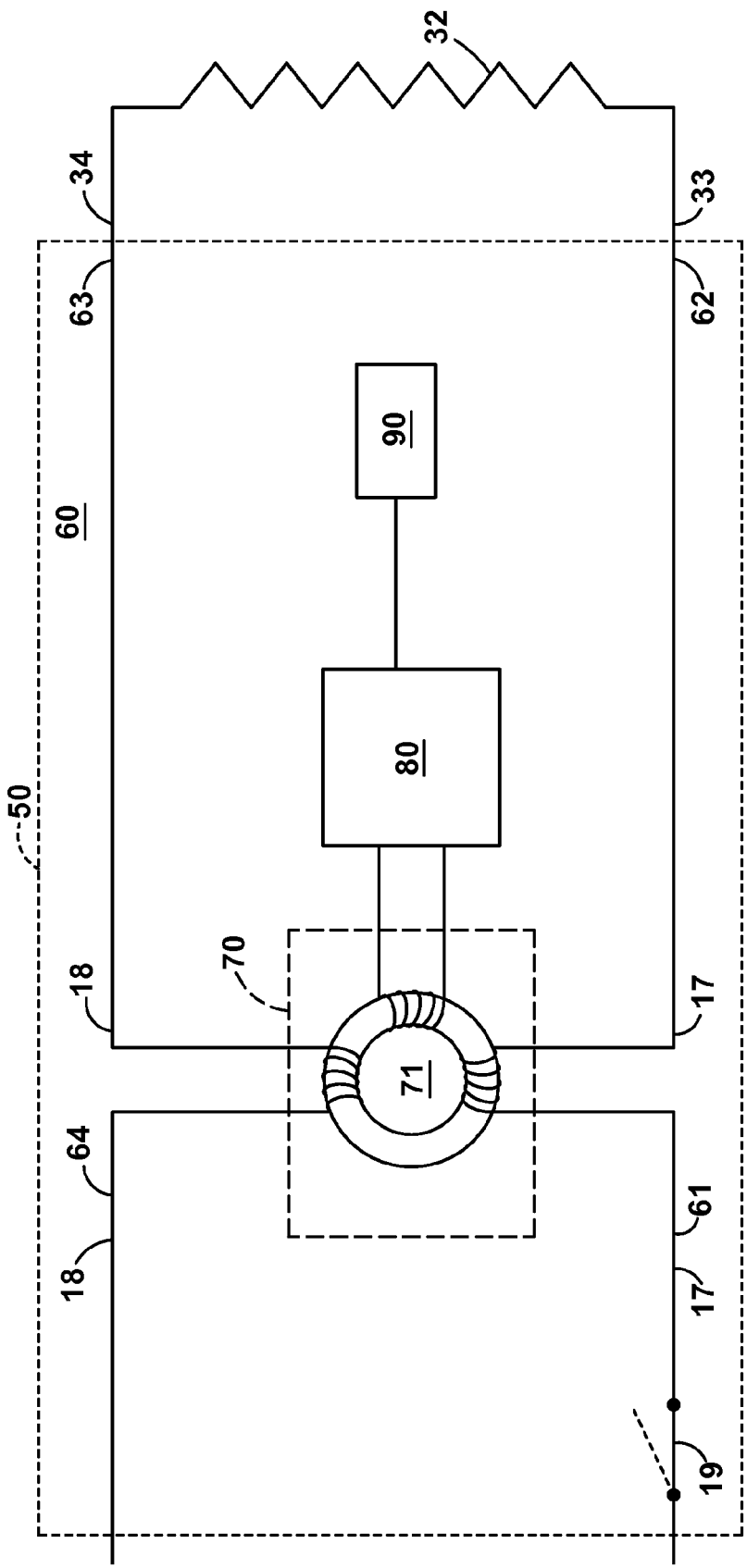

FIG. 5 schematically shows the internal and/or operational components of the ground-fault-interruption device.

Figure 6:
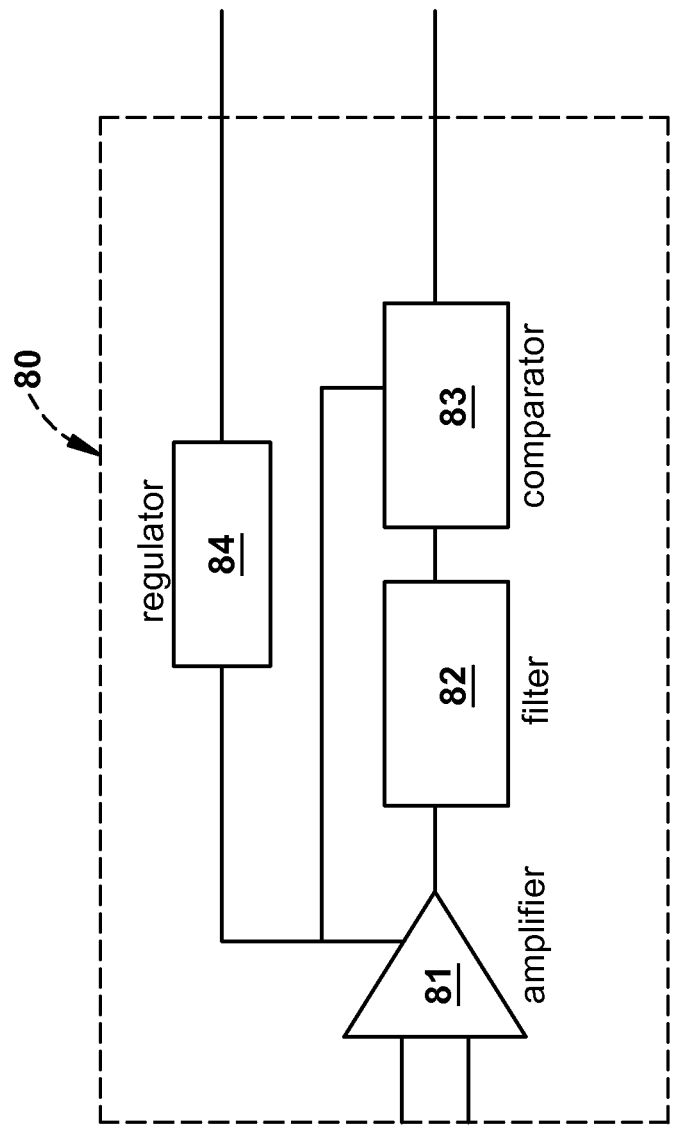

FIG. 6 shows the triggering circuitry of the ground-fault-interruption device.

FIGS. 7A-7B, FIGS. 8A-8B, FIGS. 9A-9B, FIGS. 10A-10B, FIGS. 11A-11B, and FIGS. 12A-12B show some possible triggering and/or interrupting arrangements.

DESCRIPTION

Figure 1:
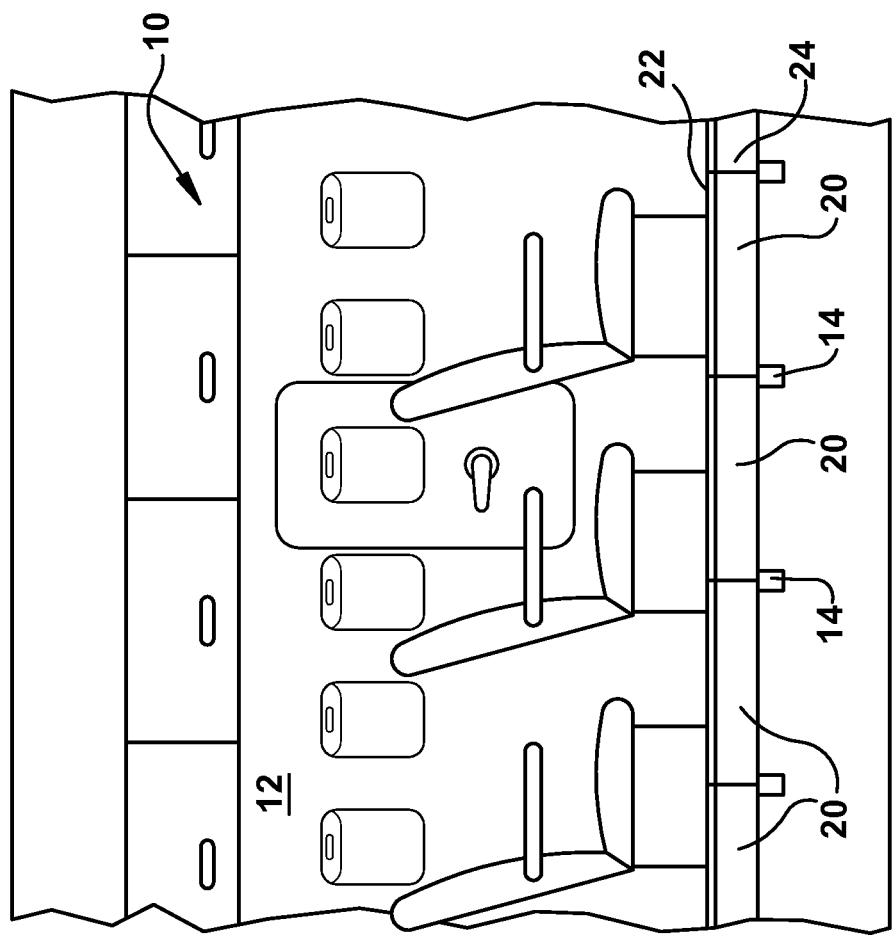
FIG. 1 shows an aircraft having electrical appliances installed thereon.

Referring now to the drawings, and initially to FIG. 1, an aircraft 10 is provided with electrical appliances 20 to insure the comfort and convenience of crew and passengers. In the illustrated embodiment, the appliances 20 are electrical floor panels 20 which maintain the cabin 12 at a suitable temperature. But the aircraft 10 could additionally or instead include other types of aircraft electrical appliances that may or may not relate to heating purposes.

Figure 2:
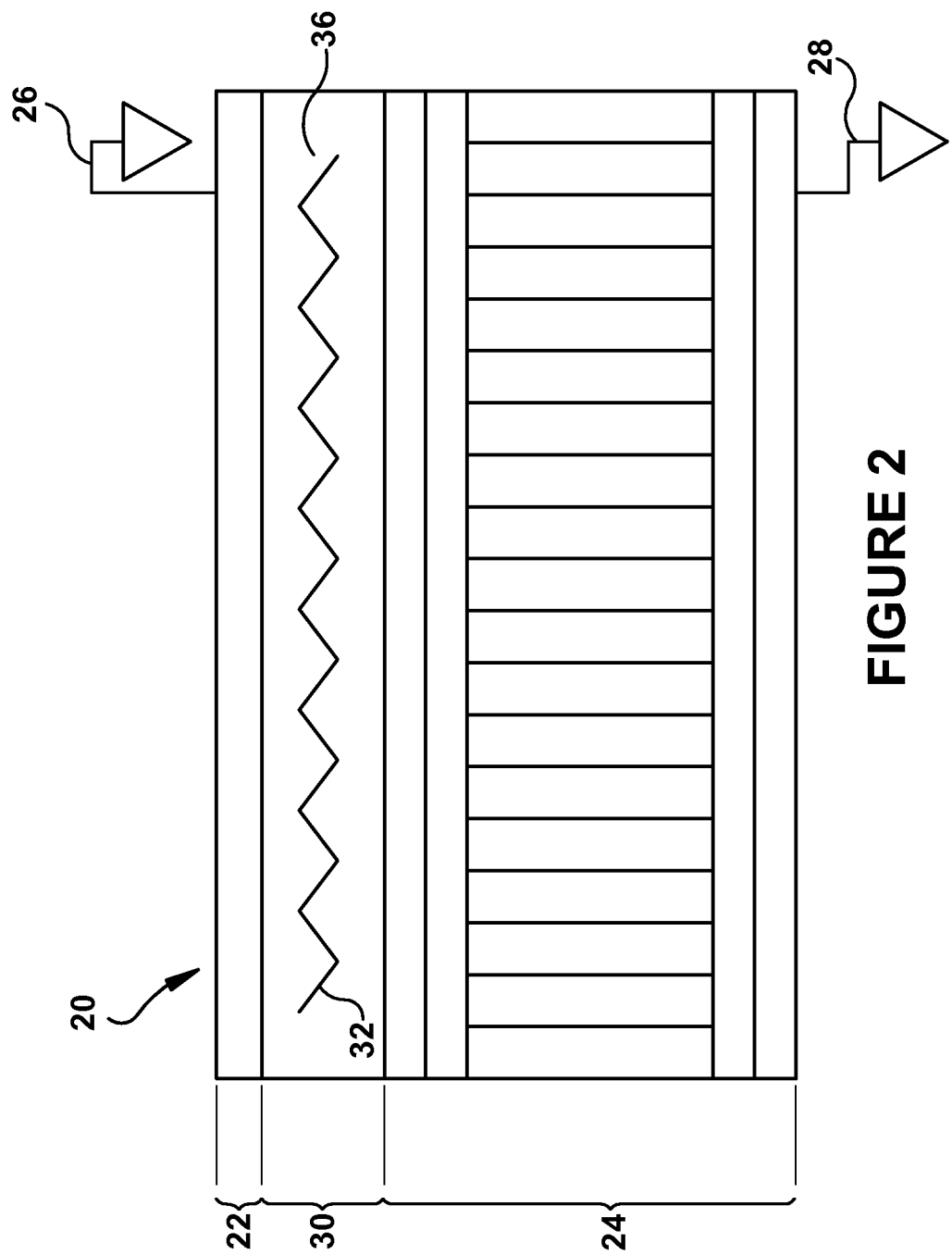
FIG. 2 is a sectional view of the electrical appliance.

The floor panels 20 can each comprise an upper layer 22 and a lower layer 24 resting upon structural members 14. And as is shown in FIG. 2, the panel 20 can include a heating layer 30 situated between the upper layer 22 and the lower layer 24. The heating layer 30 comprises an electrically resistive element 32 having leads 33 and 34. An insulator body 36 encapsulates or otherwise electrically isolates the heating element 32.

The upper layer 22 can comprise a metal (e.g., aluminum or titanium) sheet whereby it is electrically conductive. If so, the upper layer 22 and the resistance element 32 form a pair of wide conductors and the insulator body 36 forms a thin dielectric medium therebetween. Thus, the panel construction essentially forms a large capacitor wherein reactive current can form an unintended path from the resistance element 32 to the upper layer 22.

The panel's lower layer 24 is often a composite structure and this structure typically includes an electrically conductive material (e.g., graphite). Thus, the lower portion of the aircraft floor panel 20 can also essentially form a capacitor. Specifically, the lower layer 24 and the resistance element form the capacitor's conductors and the insulating body 34 therebetween forms the capacitor's dielectric medium. During operation of the heated floor panel 20, reactive current can follow an unintended path from the resistance element 34 to the lower layer 24.

To avoid accumulation of electrical charge in the upper layer 22, the heated floor panel 20 is provided with a bonding strap 26 electrically connecting the layer 22 to ground. The lower layer 24 is likewise provided with a bonding strap 28. In this manner, any stray voltage present in the upper layer 22 and/or the lower layer 24 is shorted to ground. This protects, for example, a passenger in the aircraft cabin 14 from being uncomfortably shocked when he/she comes into contact with the floor panel 20.

Figure 3A:
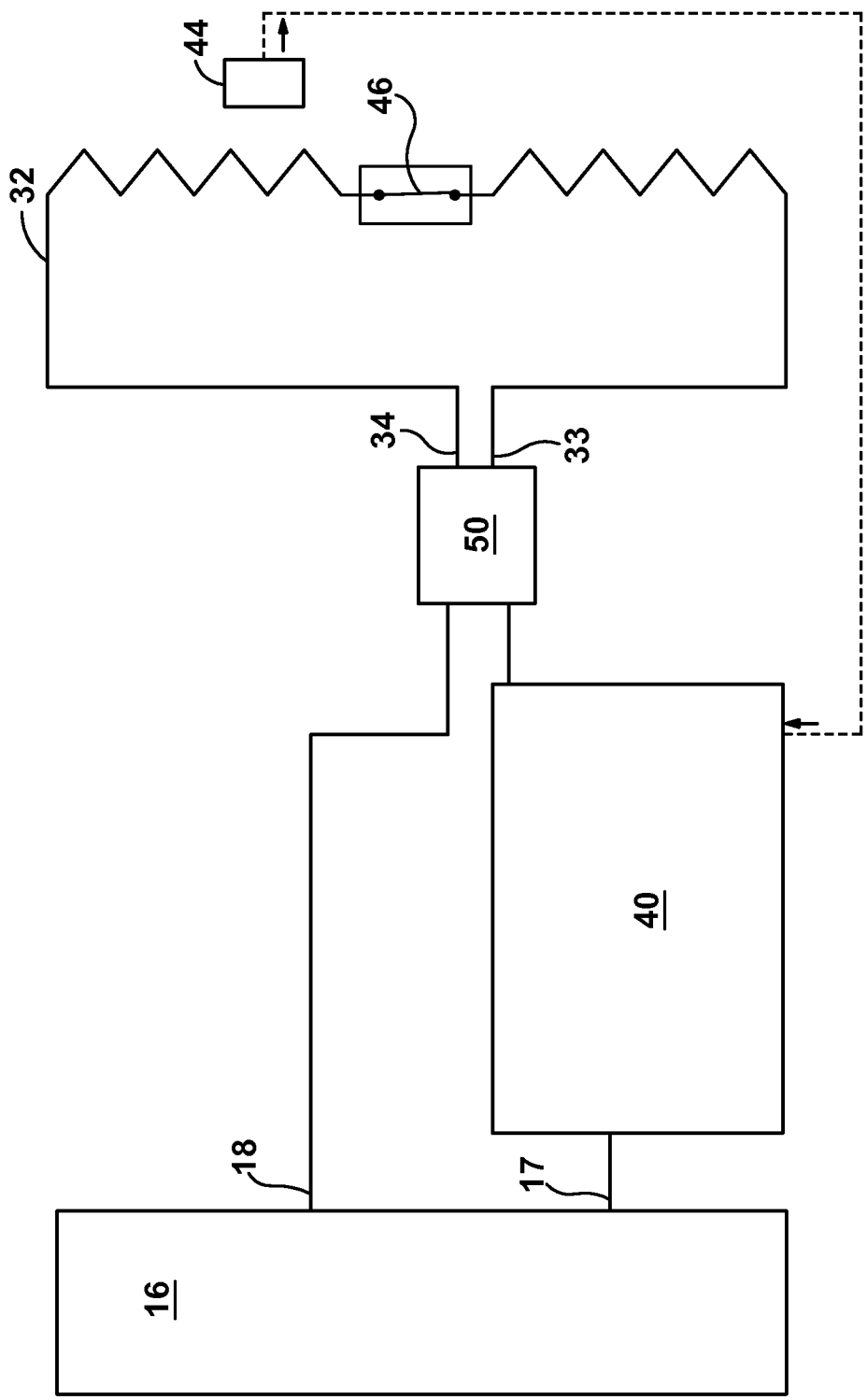

As can be seen by referring additionally to FIG. 3A, the resistance element 32 receives power from an onboard source 16 (having a power line 17 and a return line 18 extending electrically thereto and therefrom). The power source 16 typically comprises an AC generator that is driven by an aircraft propulsion unit. The voltage and frequency of power supplied from such an onboard source 16 can vary considerably during the course of a flight.

A controller 40 can be used to monitor the power provided to the resistance element 32 and thus the floor panel 20. The controller 40 can, for example, initiate current delivery to the resistance element 32 when the panel temperature falls below a lower setpoint and cease delivery when the panel temperature exceeds an upper setpoint. A sensor 44 can be used to measure panel temperature and convey a corresponding signal to the controller 40.

The heated floor panel 20 can also include a separate switch 46 to protect against overheating. The switch 46 can be completely independent of the controller 40 and actuated by a too-high panel temperature. Such a safety switch will usually be situated, as shown, in series with the resistance element 34.

The floor panel 20 further includes a GFI device 50 provided to protect it in the event of problematic lost current due, for example, to a compromise in the heater's insulator body 36. In the aircraft heated floor panel 20 shown schematically in FIG. 3A, the controller 40 is situated between the power source 16 and the GFI device 50. The onboard-source line 17 passes through the controller 40 and then to GFI device 50 (and then to the power lead 33 of the resistance element). The return lead 34 of the resistance element 32 passes through the GFI device 50 in route to line 18 of the onboard source 16. In this case, the controller 40 could be located remote from the rest of the floor panel 20 (e.g., the layers 22, 24, and 30) and/or the GFI device 50.

The controller 40 could instead be situated between the heater's resistance element 32 and the GFI device 50, as shown in FIG. 3B. For example, the power line 17 could pass from the GFI device 50 through the controller 40 in route to the lead line 33 of the resistance heater 32. In this case, the controller 40 could be located remote, adjacent, or within the panel layers 22, 24, and 30.

And, as is shown in FIG. 3C, a heated floor panel 20 without a sophisticated controller is also possible and contemplated. Indeed an advantage of the GFI device 50 is that it need not rely upon a controller or processor. For example, power to the heated floor panel 20 could be simply controlled by a timer and/or a mechanical thermoswitch.

Figure 4:
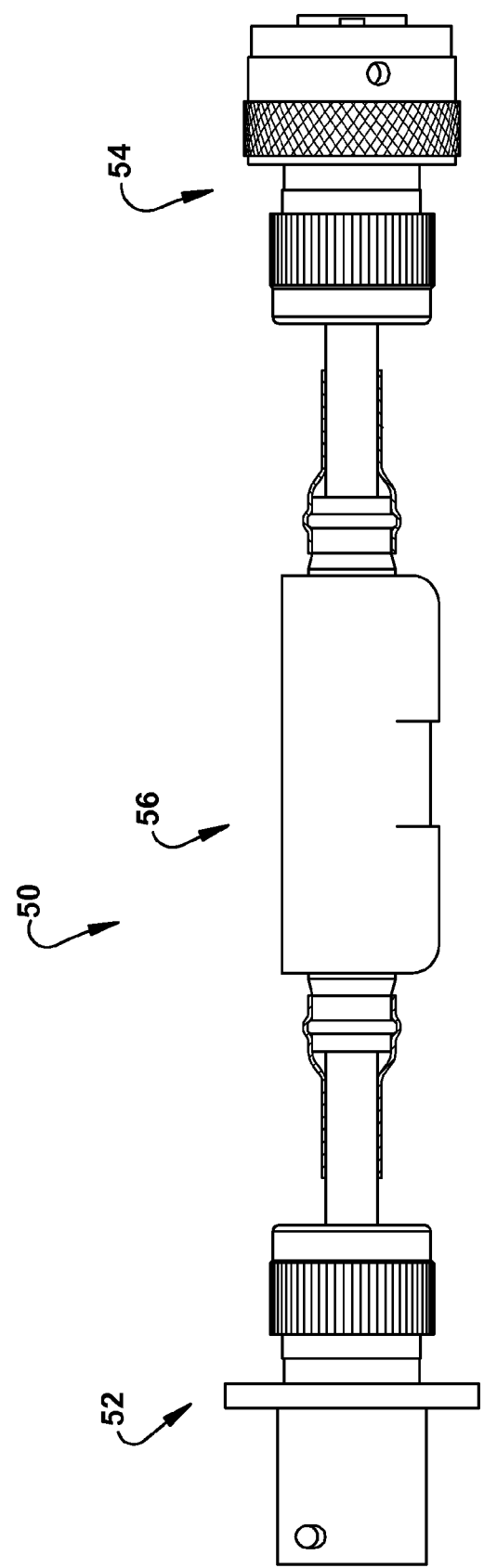
FIG. 4 shows a possible exterior construction of the ground-fault-interruption device.

As is best seen by referring briefly to FIG. 4, the GFI device 50 can comprise a source-side connector 52, a panel-side connector 54, and a casing 56 therebetween. The power-side connector 52 is electrically connected to the lines 17 and 18 of the onboard power source 16. The panel-side connector 54 is electrically connected to the leads 33 and 34 of the heater's resistance element 32.

In the arrangement shown in FIG. 3A, the connector 52 could be indirectly connected to the power line 17 through the controller 40 and the connector 54 could be directly connected to the lead 33. In the arrangement shown in FIG. 3B, the connector 52 could be directly connected to the power line 17 and the connector 54 could be indirectly connected to the lead 33 through the controller 40. And in the arrangement shown in FIG. 3C, the connector 52 could be directly connected to the power line 17 and the connector 54 could be directly connected to the lead 33.

Turning now to FIG. 5, the internal and/or operational components of the GFI device 50 are schematically shown. These components include GFI circuitry 60 and connections 61-64. With reference back to FIG. 4, the source-side connections 61 and 64 can be housed within the connector 52 for electrical connection to source lines 17 and 18 and the panel-side connections 62 and 63 can be housed within the panel-side connector 54. The GFI circuitry 60 can be housed, at least partially, within the casing 56.

The GFI circuit 60 comprises a current differential determiner 70, triggering circuitry 80, and a power-interrupter 90. The current differential determiner 70 can be (as illustrated) as a magnetic toroid 71 through which the source-side connection 61 (electrically connected to the onboard source power line 17) and the source-side connection 64 (electrically connected to the onboard source return line 18) pass. The discrepancy between current delivered to the floor panel 20 via line 17 and current returned via line 18 will induce a current $I_{diff}$ in a winding on the toroid 71 and generate a current-differential signal. The magnitude of the current-differential signal is proportional to the difference between the delivered-to-the-panel current and the returned-from-the-panel current.

When all is well, the current differential, and thus the current-differential signal generated by the determiner 70, will be representative of the capacitor-like construction of the floor panel 20. Specifically, this differential will reflect reactive current following unintended paths to the layers 22 and 24 and then grounding via the bonding straps 26 and 28. The determination of current differential, as opposed to a strict measurement of current, allows the GFI device 50 to compensate for the varying voltage and frequency of power supplied from the onboard source 16 during the course of a flight.

As can be seen by referring briefly to FIG. 6, the triggering circuitry 80 can comprise an amplifier 81 (for amplifying the signal), a filter 82 (for filtering noise out of the amplified signal), and a comparator 83. The comparator 83 compares the amplified and filtered signal to a preset threshold. A regulator 84 and/or a resistor (not shown) can also be provided.

The preset threshold used by the comparator 83 corresponds to a current differential exceeding that which would occur due to the capacitor-like construction of the floor panel 20. Specifically, a current-differential signal (once amplified and filtered) beyond this threshold indicates a compromise in the electrical isolation of the heater's resistance element 32. Such a compromise would occur, for example, upon a dielectric breakdown in the insulation body 36 resulting in a short-circuit condition within the panel layers.

If the current-differential signal does not exceed the preset threshold (e.g., all is well), the interrupter 90 is not activated, and power is provided to the resistance element 32 in a routine manner. But if the current-differential signal does exceed the preset threshold (e.g., there has been a compromise of the heater's electrical insulation), the interrupter 90 is activated so as to cease power supply to the resistance heater 32.

Figure 7A:
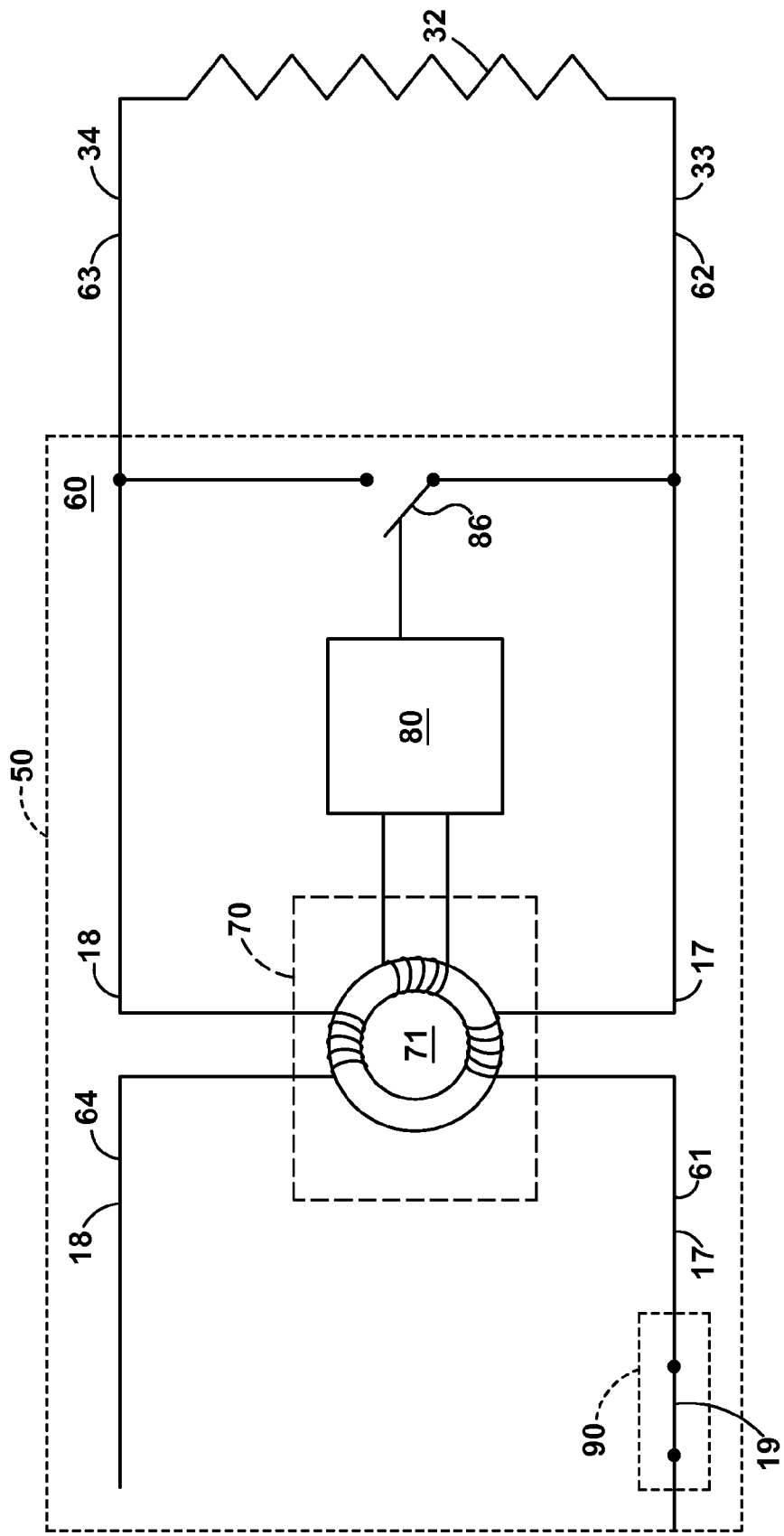
Figure 7B:
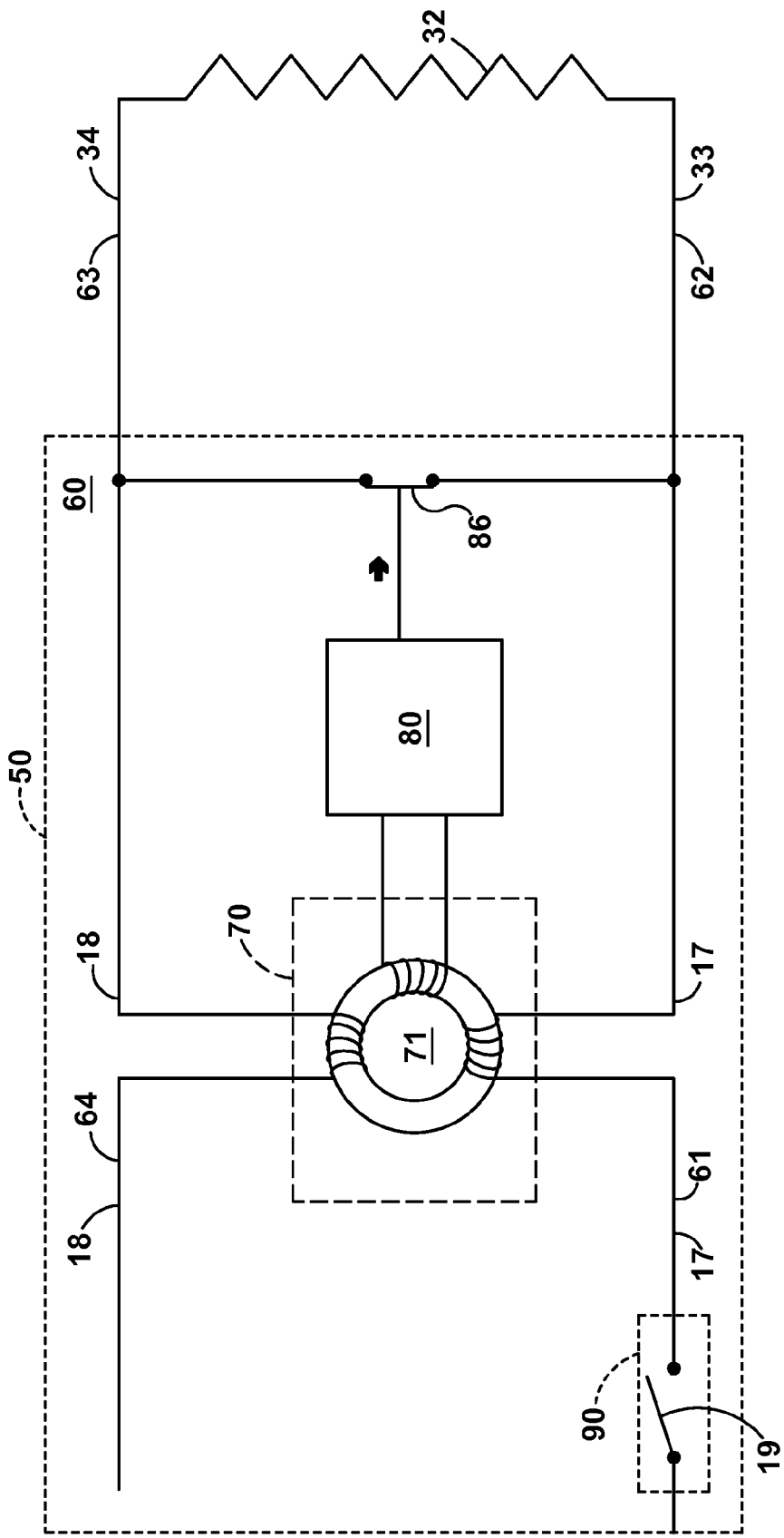

In the arrangement shown in FIGS. 7A and 7B, the circuitry 80 comprises a trigger 86 (e.g., a TRIAC gate, a FET switch, a relay, or any other suitable device) that can be activated to cause a short circuit of the heater element 32. The power interrupter 90 can comprise a main circuit breaker 19 in the supply line 17 that is used in a routine manner. Upon activation of the trigger 86, and the so-caused short circuit, the breaker 19 opens thereby interrupting further power input to the heater element 32. This type of GFI device 50 can be easily installed in series with the panel's wire harness and can be reused by resetting of the circuit breaker 19.

Figure 8A:
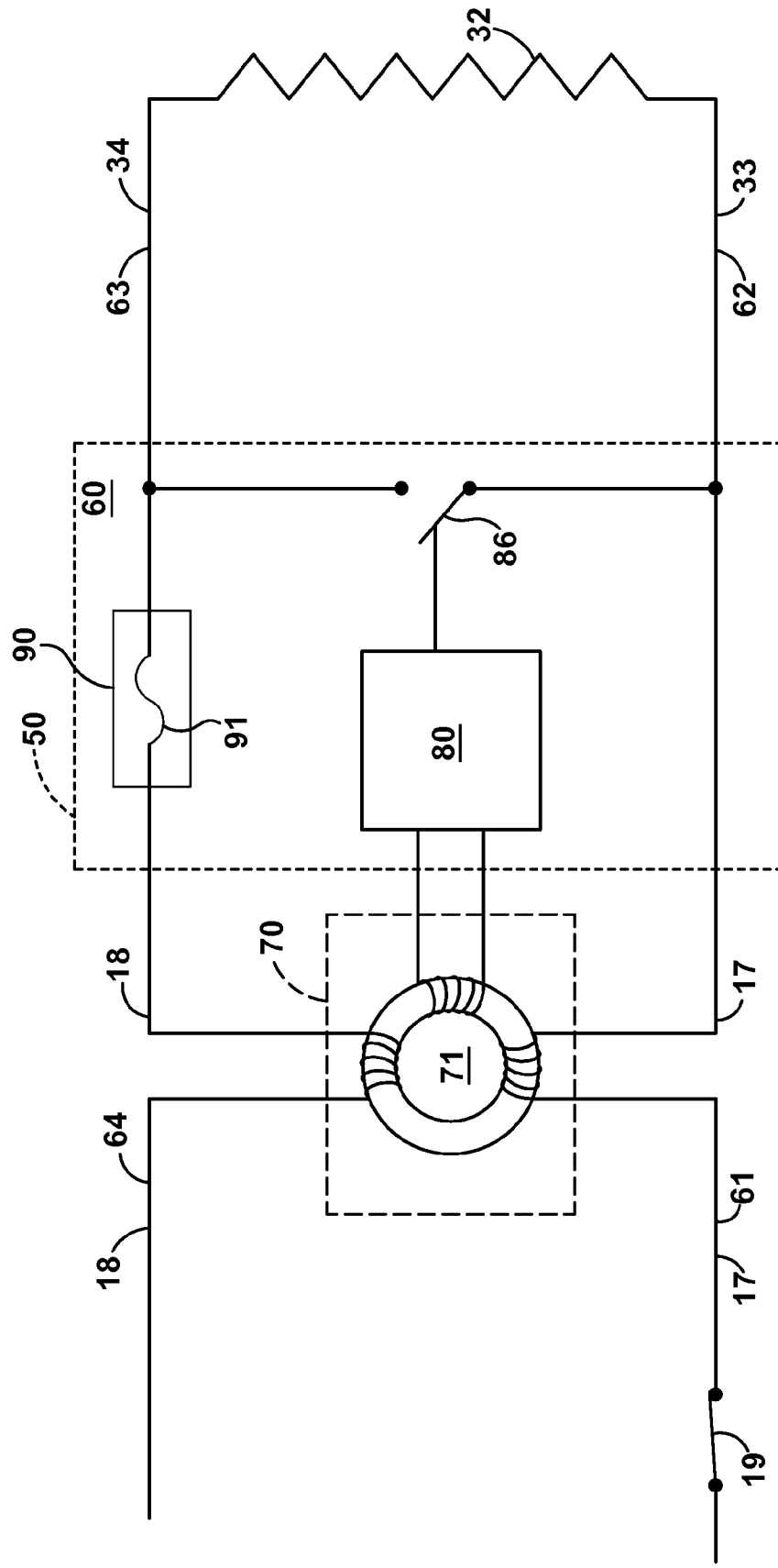
Figure 8B:
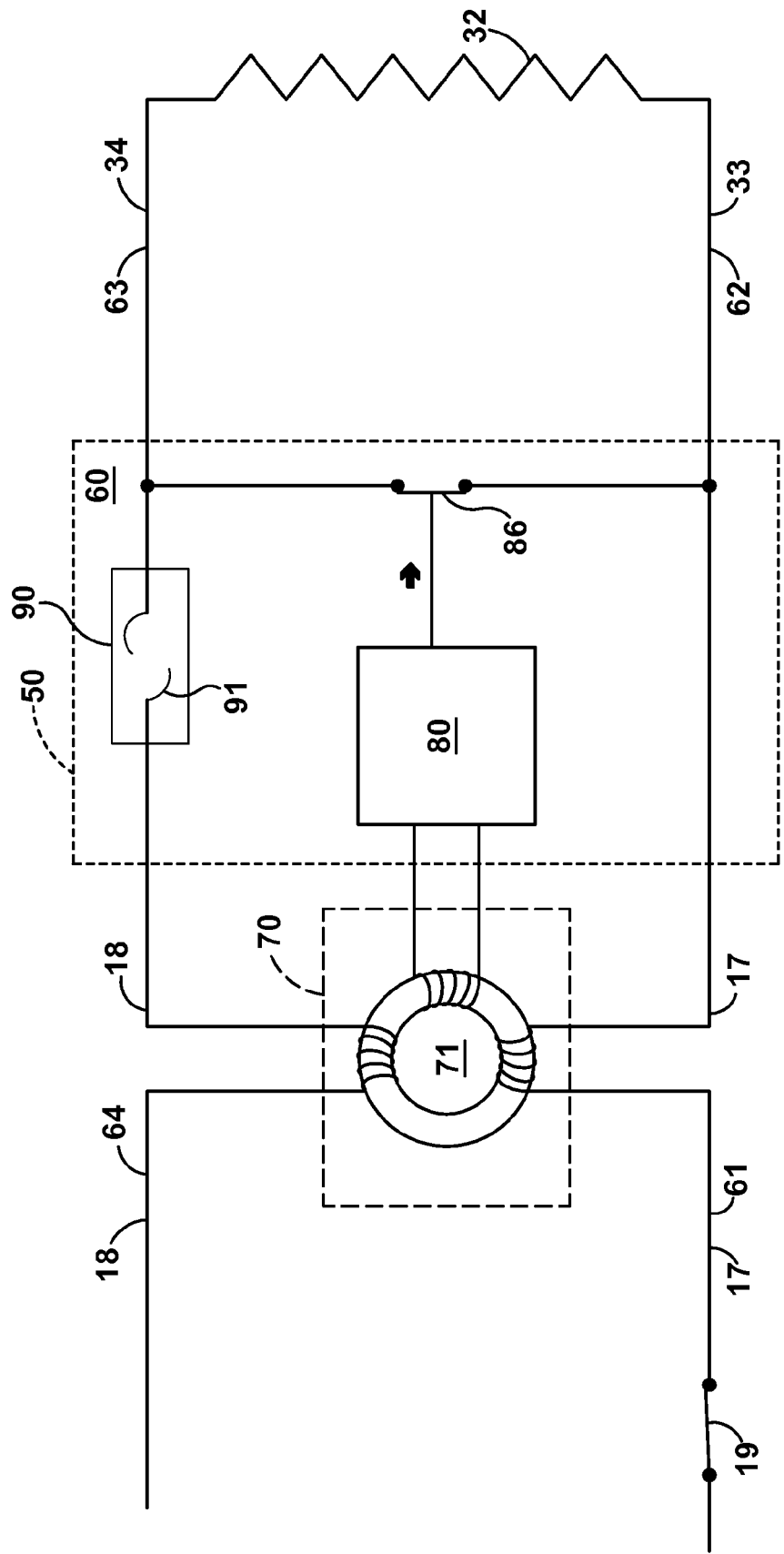

In the arrangement shown in FIGS. 8A and 8B, the power interrupter 90 comprises an electrical fuse 91 situated in series with the connection 64 to the onboard return line 18. The electrical fuse 91 is selected to have a blow point corresponding to the current in a short-circuit condition (e.g., 10 Amps). This type of GFI device 50 can be easily installed in series with the panel's wire harness. And although its design may only accommodate a single-use situation, this will often be practical as the panel 20 will usually be retired upon a ground fault event.

Figure 9A:
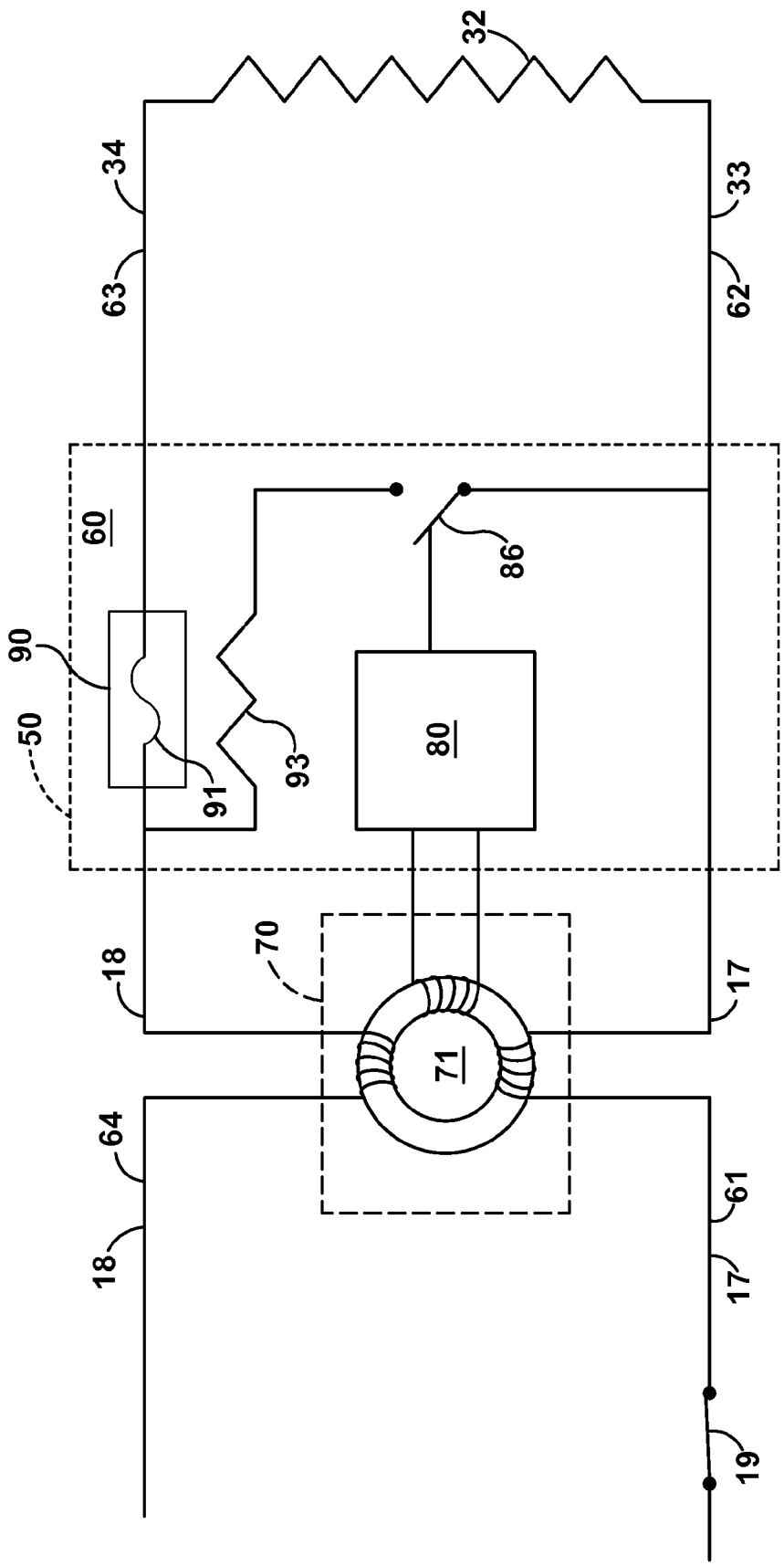
Figure 9B:
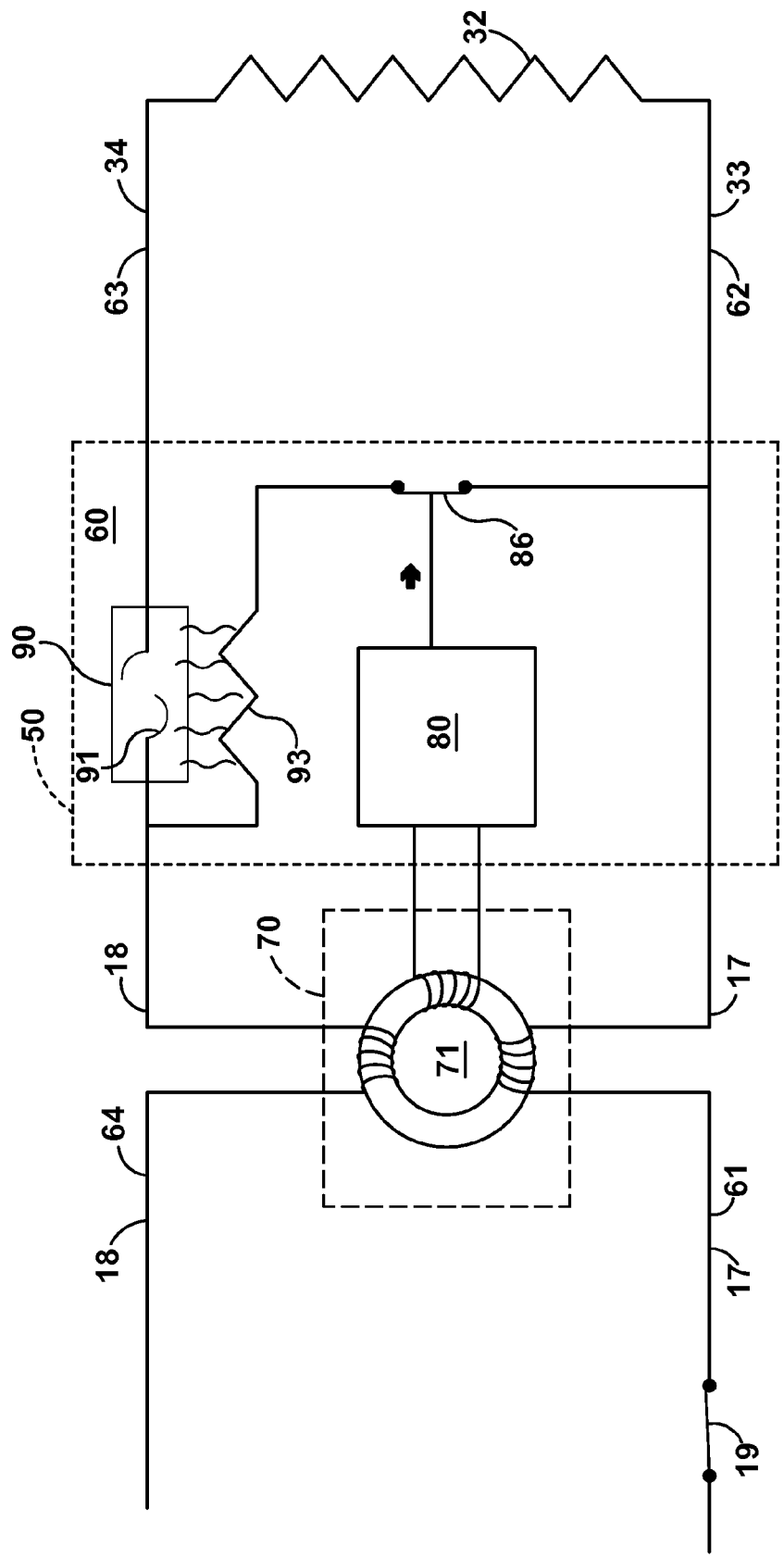

In the arrangement shown in FIGS. 9A and 9B, the power interrupter 90 comprises a thermal fuse 92 and a fuse-opening heater 93. The heater 93 is completely separate from the primary heating element 32 and its only function is to heat the fuse 92. The thermal fuse 92, like the electrical fuse 91, is situated in series with the onboard-return connection 18. The heater 93 is provided with power upon the trigger causing a short circuit of the heater element 32. This design, like that shown in FIGS. 8A and 8B, may be easily installed and may only accommodate a single-use situation.

Figure 10A:
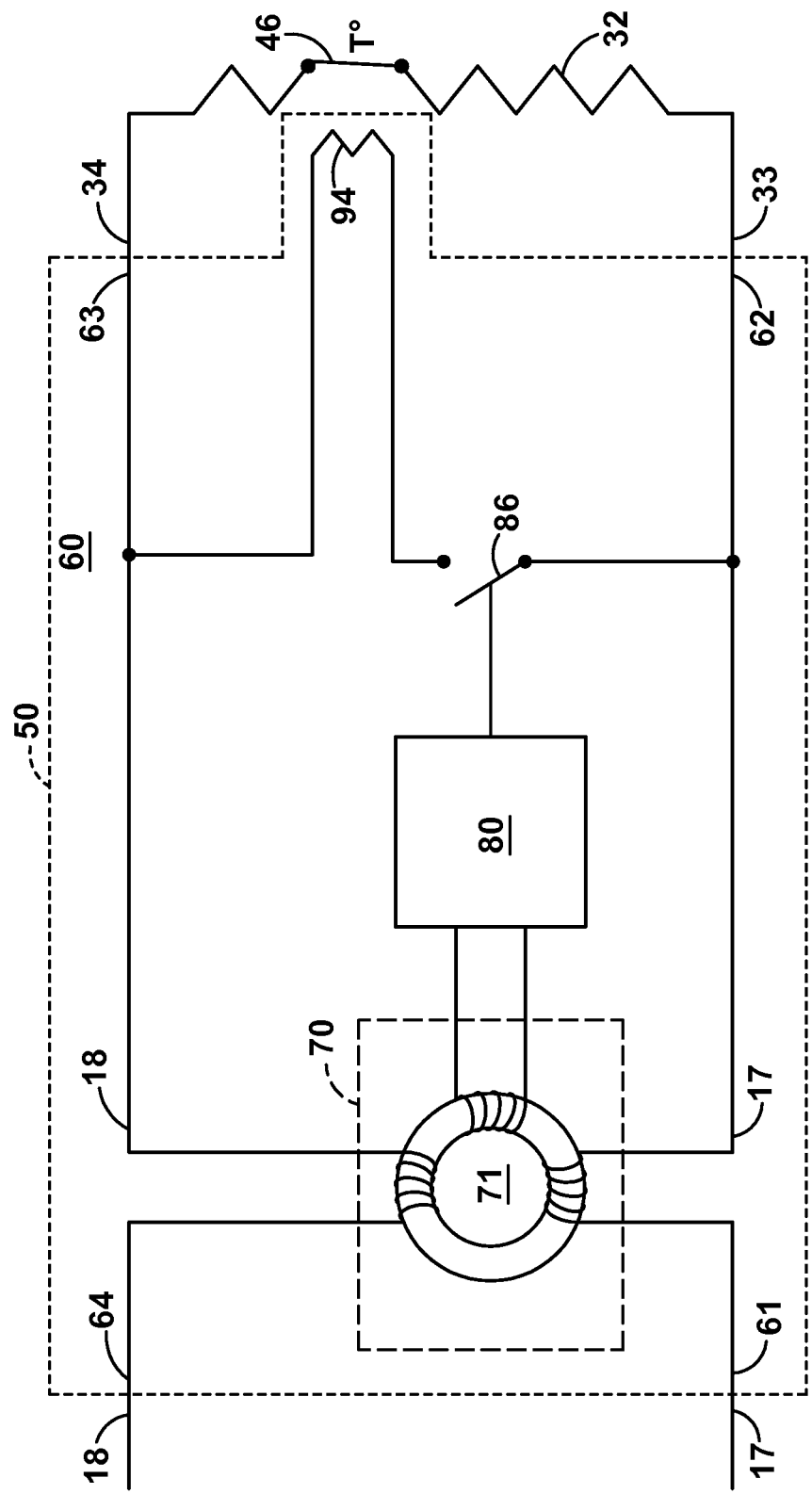
Figure 10B:
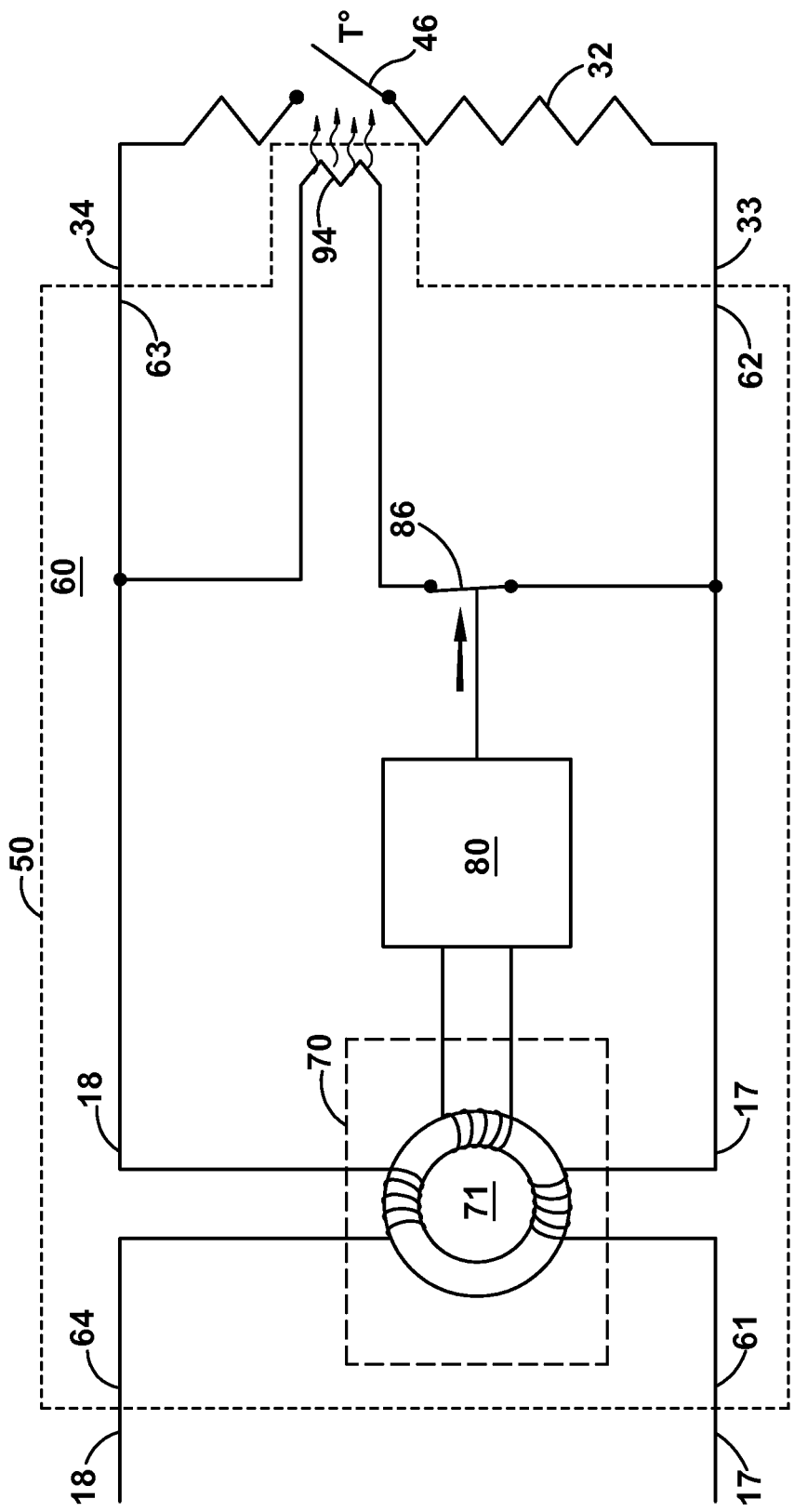

In the arrangement shown in FIGS. 10A and 10B, the primary heater's switch 46 can be called upon to perform a dual function of too-high-temperature protection and ground-fault protection. In this case, a heater element 94 (completely separate from the primary heating element 32) would still be used, but it would be positioned adjacent the switch 46. Upon activation of the trigger 84, current would be redirected through the element 92, thereby generating heat which would open the switch 46 in the same manner as would occur in an overheat situation.

Figure 11A:
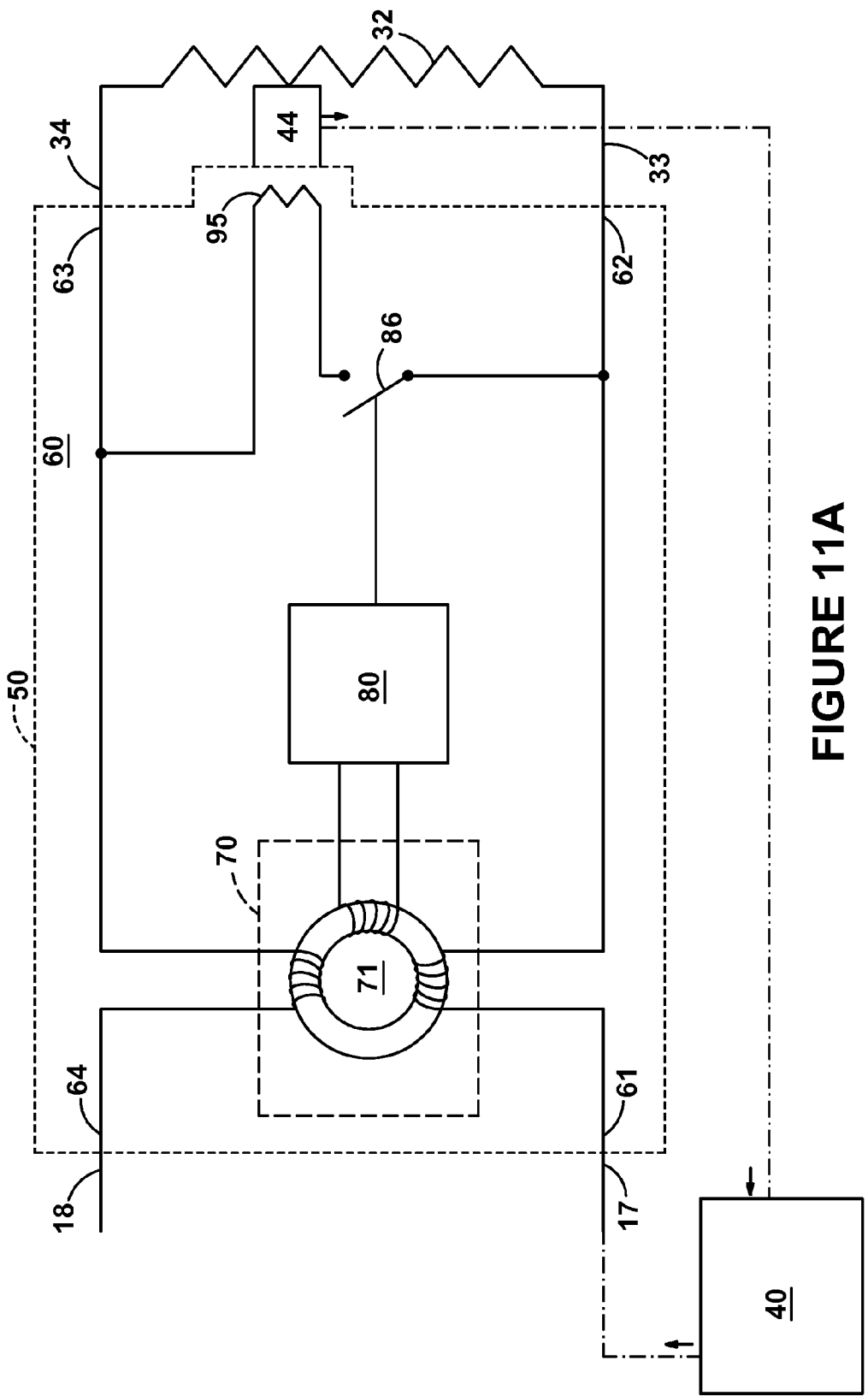
Figure 11B:
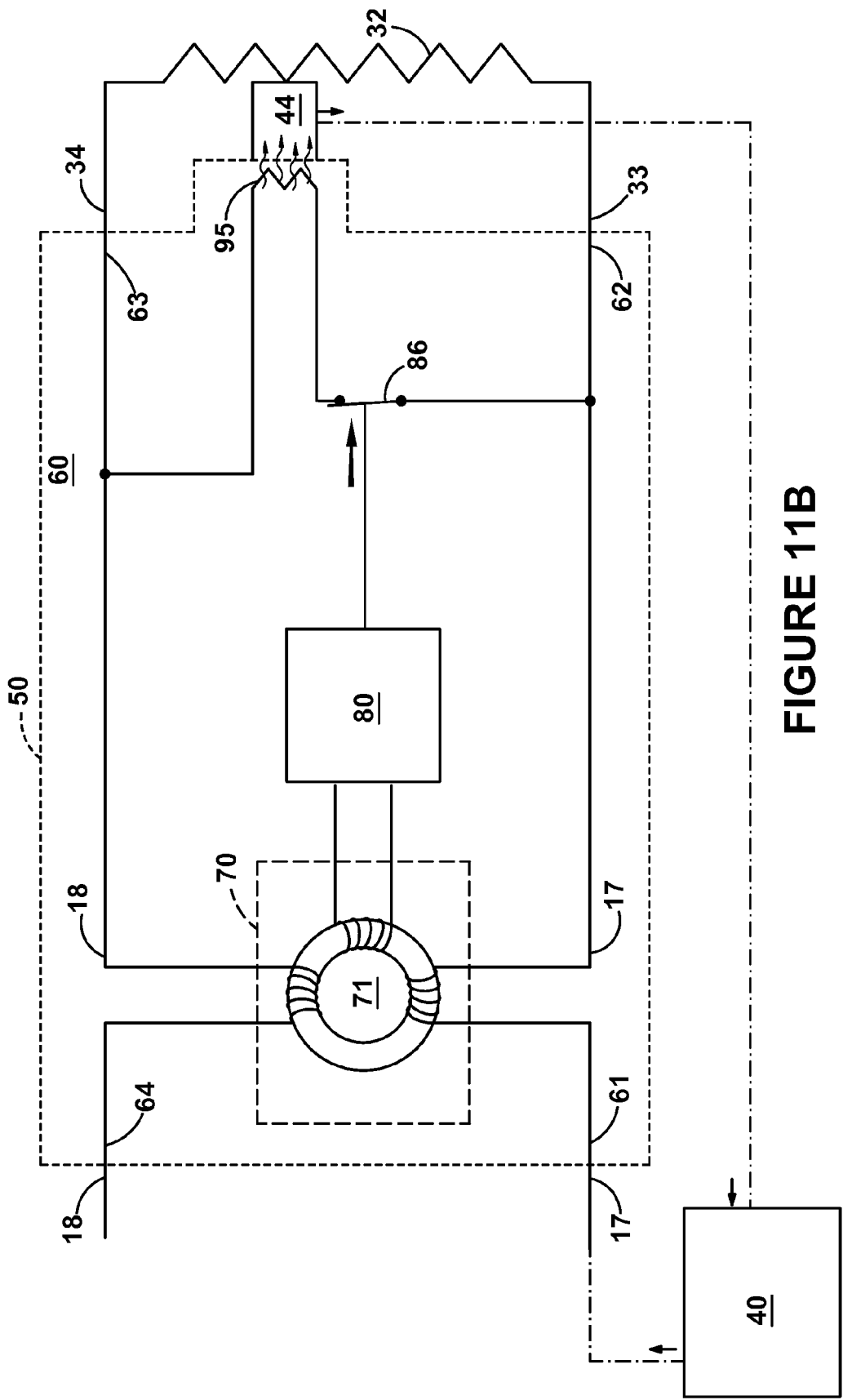

In the arrangement shown in FIGS. 11A and 11B, the controller 40 is called upon to cease power supply to the heater element 32 upon a ground-fault condition. In this arrangement, a separate heater element 95 (which, like the heater element 94 in FIG. 10 is completely separate from the primary heating element 32) is positioned adjacent the controller's temperature sensor 44. Upon activation of the trigger 84, current would be redirected through the heater 95 thereby generating heat adjacent the sensor 44. This will cause the sensor 44 to send a signal to the controller 40 to terminate power supply to the heater 32. In other words, the controller 40 is "tricked into thinking" that panel temperature is such that no power need be provided thereto.

Figure 12A:
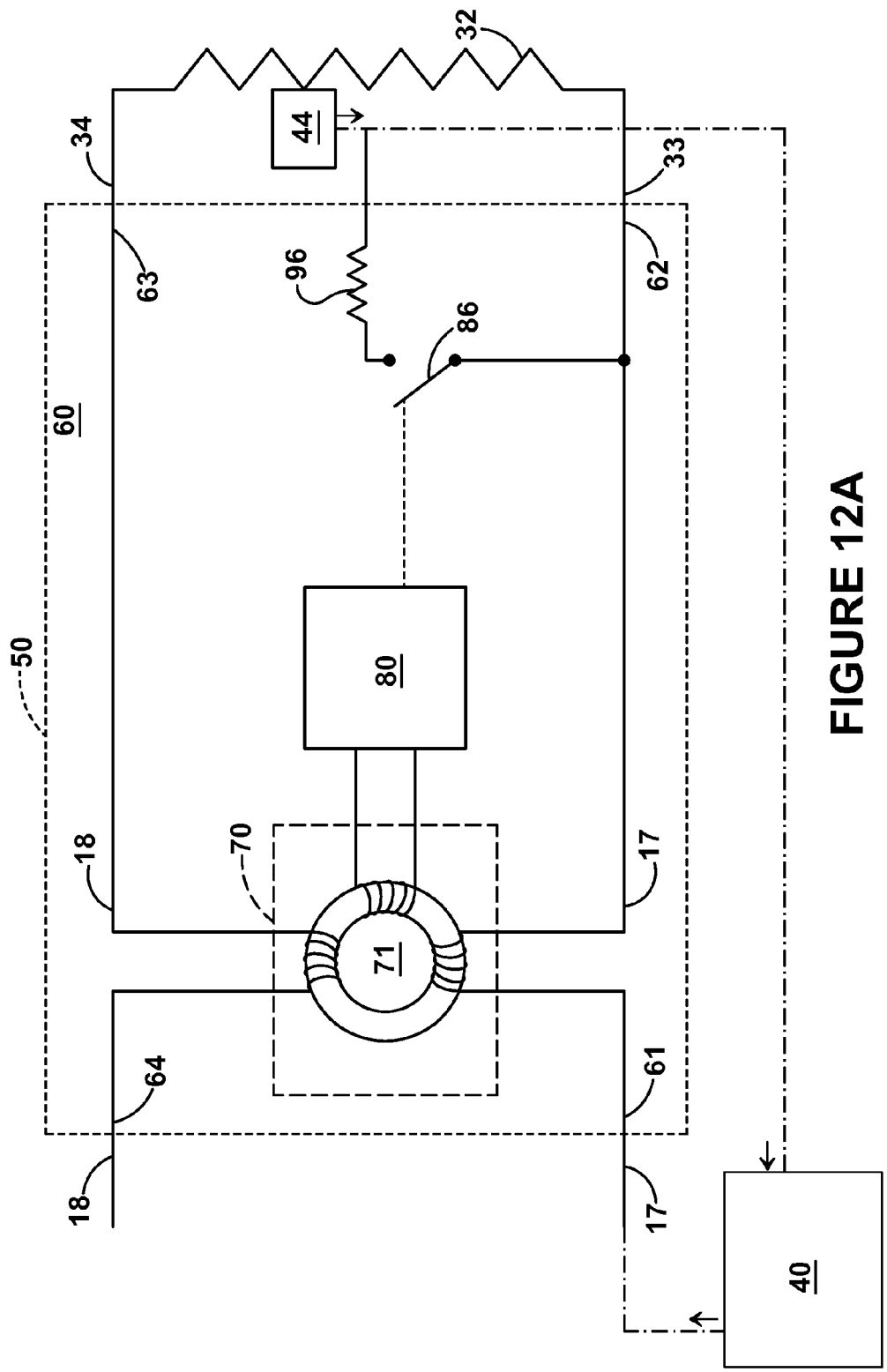
Figure 12B:
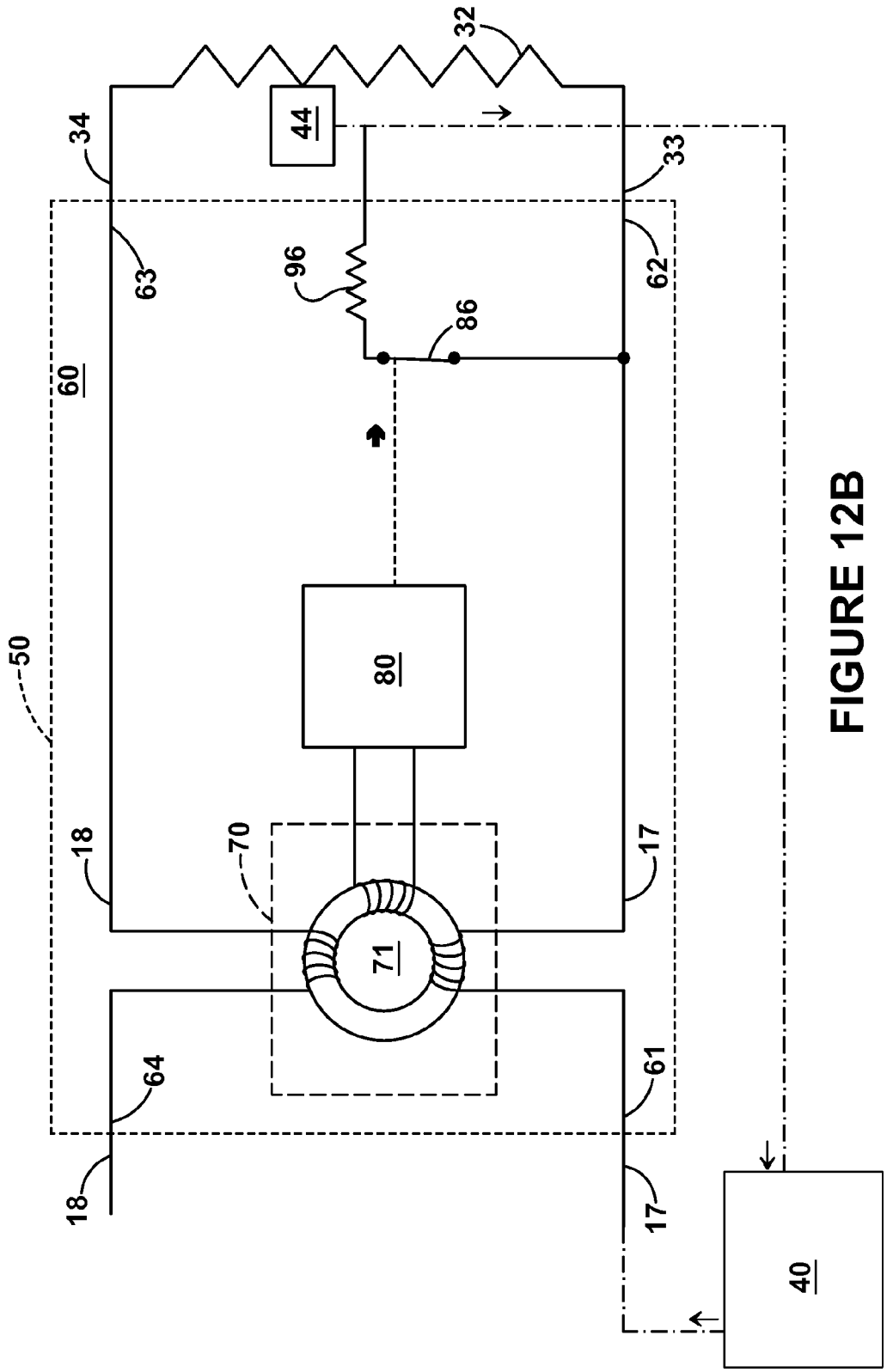

In the arrangement shown in FIGS. 12A and 12B, the controller 40 is also called upon to cease power supply to the heater element 32 upon a ground-fault condition. In this arrangement, however, a separate resistor 96 is used to simulate a heated condition. Upon activation of the trigger 84, the controller 40 acts as though panel temperature is sufficient and no power input is required.

In the interrupters 90 shown in FIGS. 7-9, the interrupting component (e.g., the fuse 91, the fuse 92, and/or the switch 46) is completely independent of the controller 40. The device 50 does not require, and it need not work in conjunction with, controller components. This construction can negate the need for expensive software configuration and confirmation (e.g. testing).

In the interrupters 90 shown in FIGS. 9-11, a triggering heater (e.g., the heater 93, the heater 94, and/or the heater 95) is employed to trigger an interruption of power supply to the panel. These triggering heaters are completely separate from the primary heating element 32 used for heating purposes. The heaters 93/94/95 are only activated upon a ground-fault condition, not during normal panel operation.

In the interrupter shown in FIGS. 11-12, a "sufficient panel temperature" is simulated so that the controller 40 ceases any further power input to the primary heater 32. The controller 40 continues to operate on other levels in a routine manner, whereby its other features may still be employed.

One may now appreciate that the ground-fault-interruption device 50 can have a cost-effective construction, can be made without sophisticated software, and/or can accommodate the range of power frequencies commonly encountered in an aircraft situation. Although the aircraft 10, the appliance 20, and/or the ground-fault interruption device 50 have been shown and described with respect to a certain embodiment or embodiments, it is obvious that equivalent alterations and modifications will occur to others skilled in the art upon the reading and understanding of this specification and the annexed drawings. As was indicated above, for example, the appliance 20 need not be a heated floor panel and/or heating appliance.

The invention claimed is:

1. A ground-fault-interruption device for an aircraft electrical appliance, said ground-fault-interruption device comprising:
   a source-power-line connection for connection to a power line of an onboard power source, an appliance-power-lead connection for connection to the power lead of the electrical element, an appliance-return-lead connection for connection to the return lead of the electrical element, a source-return-line connection for connection to a return line of the onboard power source, and a GFI circuit comprising:
      a current differential determiner that determines the current differential between the source-power-line connection and source-return-line connection, a trigger that is activated upon the current differential corresponding to ground-fault situation, and an interrupter that interrupts power supply through the appliance-power-lead connection upon the trigger being activated; wherein the GFI circuit is electrically independent of electrical controller components of the appliance;
   wherein the interrupter comprises components that simulate a sufficient panel temperature to a controller.

2. A ground-fault-interruption device as set forth in claim 1, wherein the interrupter comprises a circuit breaker.

3. A ground-fault-interruption device as set forth in claim 2, wherein the trigger causes a short circuit between the appliance-power-lead connection and the appliance-return-lead connection, thereby causing the circuit breaker to open.

4. A ground-fault-interruption device as set forth in claim 1, wherein the interrupter comprises a fuse.

5. A ground-fault-interruption device as set forth in claim 4, wherein the fuse comprises an electrical fuse having an opening threshold corresponding to a current path that is a short circuit between the appliance-power-lead connection and the appliance-return-lead connection.

6. A ground-fault-interruption device as set forth in claim 4, wherein the fuse comprises a thermal fuse.

7. A ground-fault-interruption device as set forth in claim 6, wherein the interrupter comprises a fuse-opening heater situated adjacent to the thermal fuse.

8. A ground-fault-interruption device as set forth in claim 7, wherein the fuse-opening heater heats to a fuse-opening temperature with a current path that is a short circuit between the appliance-power-lead connection and the appliance-return-lead connection.

9. A ground-fault-interruption device as set forth in claim 4, wherein the trigger causes a short circuit between the appliance-power-lead connection and the appliance-return-lead connection thereby causing the fuse to open.

10. A ground-fault-interruption device as set forth in claim 1, wherein the current differential determiner comprises:
   a magnetic toroid through which the source-power-line connection and the source-return-line connection pass to generate current-differential signal; and a comparator that compares the current-differential signal to a preset threshold and activates the trigger upon the signal exceeding this preset threshold.

11. A ground-fault-interruption device as set forth in claim 10, wherein the trigger threshold is a non-zero value.

12. A ground-fault-interruption device as set forth in claim 1, wherein the trigger is a TRIAC gate, a FET switch, or a relay.

13. A ground-fault-interruption device as set forth in claim 1, comprising a source-side connector housing the source-power-line connection and the source-return-line connector, an appliance-side connection housing the appliance-power-lead connection and the appliance-return-lead connection, and a casing therebetween which at least partially houses the GFI circuit.

14. A ground-fault-interruption device as set forth in claim 1 and an aircraft electrical appliance comprising an electrical element;
   wherein the electrical element has a power lead and the device's appliance-power-lead connection is connected to this power lead; and the electrical element has a return lead and the device's appliance-return-lead connection is connected to this return lead.

15. A ground-fault-interruption device as set forth in claim 1 and an aircraft heated floor panel comprising an electrical heating element;
   wherein the electrical heating element has a power lead and the device's appliance-power-lead connection is connected to this power lead; and the electrical heating element has a return lead and the device's appliance-return-lead connection is connected to this return lead.

16. A ground-fault-interruption device as set forth in claim 1 and an aircraft electrical appliance having an electrical element and a construction that essentially forms a large capacitor whereby reactive current can form an unintended path from the electrical element;
   wherein: the electrical element has a power lead and the device's appliance-power-lead connection is connected to this power lead; and the electrical element has a return lead and the device's appliance-return-lead connection is connected to this return lead.

17. A ground-fault-interruption device as set forth in claim 1 installed in an aircraft including an onboard power source and an electrical appliance having an electrical heating element;
   wherein: the electrical heating element has a power lead and the device's appliance-power-lead connection is connected to this power lead;
   the electrical heating element has a return lead and the device's appliance-return-lead connection is connected to this return lead;
   a power line extends from the power source and this line is connected to the device's source-power-line connection; and
   a return line extends to the power source and this line is connected to the device's return-power-line connection.

* * * * *